(12) United States Patent
Yagi

(10) Patent No.: US 12,287,992 B2
(45) Date of Patent: Apr. 29, 2025

(54) PRINTING APPARATUS, CONTROL METHOD FOR CONTROLLING PRINTING APPARATUS, AND STORAGE MEDIUM THAT STORES PROGRAM

(71) Applicant: CANON KABUSHIKI KAISHA, Tokyo (JP)

(72) Inventor: Yuichi Yagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/510,435

(22) Filed: Nov. 15, 2023

(65) Prior Publication Data

US 2024/0078059 A1   Mar. 7, 2024

Related U.S. Application Data

(63) Continuation of application No. 18/067,289, filed on Dec. 16, 2022, now Pat. No. 11,836,395, and a continuation of application No. 17/688,668, filed on Mar. 7, 2022, now Pat. No. 11,556,284, which is a continuation of application No. 16/368,736, filed on Mar. 28, 2019, now Pat. No. 11,403,047.

(30) Foreign Application Priority Data

Apr. 5, 2018   (JP) .................................. 2018-073490

(51) Int. Cl.
  *G06F 3/12*   (2006.01)
(52) U.S. Cl.
  CPC .......... *G06F 3/1205* (2013.01); *G06F 3/1204* (2013.01); *G06F 3/1259* (2013.01); *G06F 3/1274* (2013.01); *G06F 3/1286* (2013.01)

(58) Field of Classification Search
None
See application file for complete search history.

(56) References Cited

U.S. PATENT DOCUMENTS

| | | | |
|---|---|---|---|
| 2017/0090841 A1 | 3/2017 | Totsuka | |
| 2017/0134601 A1* | 5/2017 | Totsuka | ............. H04N 1/00917 |
| 2019/0310809 A1* | 10/2019 | Sekine | .................. G06F 3/1235 |

FOREIGN PATENT DOCUMENTS

| | | |
|---|---|---|
| JP | 2005057631 A | 3/2005 |
| JP | 2006062266 A | 3/2006 |
| JP | 2014091215 A | 5/2014 |
| JP | 2017007101 A | 1/2017 |
| JP | 2017064953 A | 4/2017 |
| JP | 2017087537 A | 5/2017 |
| JP | 2017087591 A | 5/2017 |
| KR | 20050020705 A | 3/2005 |
| KR | 20170037844 A | 4/2017 |

* cited by examiner

*Primary Examiner* — Dov Popovici
(74) *Attorney, Agent, or Firm* — Canon U.S.A., Inc. IP Division

(57) ABSTRACT

A printing apparatus includes a reception unit configured to receive a print job, and an execution unit configured to execute printing of the print job received by the reception unit. The execution unit has a function of, in a case where a setting time or more elapses with a particular cause preventing the printing of the print job not being removed, canceling the printing of the print job. The execution unit has a function of canceling printing of a new print job received by the reception unit in a state where the setting time or more elapses with the particular cause not being removed.

14 Claims, 5 Drawing Sheets

PRINTING APPARATUS, CONTROL METHOD FOR CONTROLLING PRINTING APPARATUS, AND STORAGE MEDIUM THAT STORES PROGRAM

CROSS-REFERENCE TO RELATED APPLICATION

This application is a Continuation of U.S. application Ser. No. 18/067,289, filed Dec. 16, 2022; which is a Continuation of U.S. application Ser. No. 17/688,668, filed Mar. 7, 2022, now U.S. patent Ser. No. 11/556,284, issued Jan. 17, 2023; which is a Continuation of U.S. application Ser. No. 16/368,736, filed Mar. 28, 2019, now U.S. patent Ser. No. 11/403,047, issued Aug. 2, 2022; which claims priority from Japanese Patent Application No. 2018-073490, filed Apr. 5, 2018, which are hereby incorporated by reference herein in their entireties.

BACKGROUND

Field of the Disclosure

The present disclosure relates to a printing apparatus, a control method for controlling a printing apparatus, and a storage medium that stores a program.

Description of the Related Art

In an office environment, a plurality of users inputs (transmits) a print job to a printer, using a printer driver via a host computer of each user, and the printer executes the printing of the input print job. If a particular cause preventing printing (a suspension cause), such as a paper jam or toner shortage, occurs, a printer installed in such an office environment does not execute the printing of a received print job, and waits for the suspension cause to be removed. If the suspension cause is removed, the printer executes the printing.

Japanese Patent Application Laid-Open No. 2017-87591 discusses a printing apparatus that, if a setting time elapses with a suspension cause not being removed, automatically cancels the printing of a print job received by the time when the setting time elapses.

SUMMARY

According to an aspect of the present disclosure, a printing apparatus includes a reception unit configured to receive a print job, and an execution unit configured to execute printing of the print job received by the reception unit. The execution unit has a function of, in a case where a setting time or more elapses with a particular cause preventing the printing of the print job not being removed, canceling the printing of the print job. The execution unit has a function of canceling printing of a new print job received by the reception unit in a state where the setting time or more elapses with the particular cause not being removed.

Further features of the present disclosure will become apparent from the following description of exemplary embodiments with reference to the attached drawings.

DESCRIPTION OF THE EMBODIMENTS

With reference to the accompanying drawings, exemplary embodiments of the present disclosure will be described in detail below. The following exemplary embodiments are not intended to limit the disclosure according to the appended claims, and not all the combinations of the features described in the exemplary embodiments are essential for a method for solving the issues targeted to be solved by the present disclosure.

Figure 1:
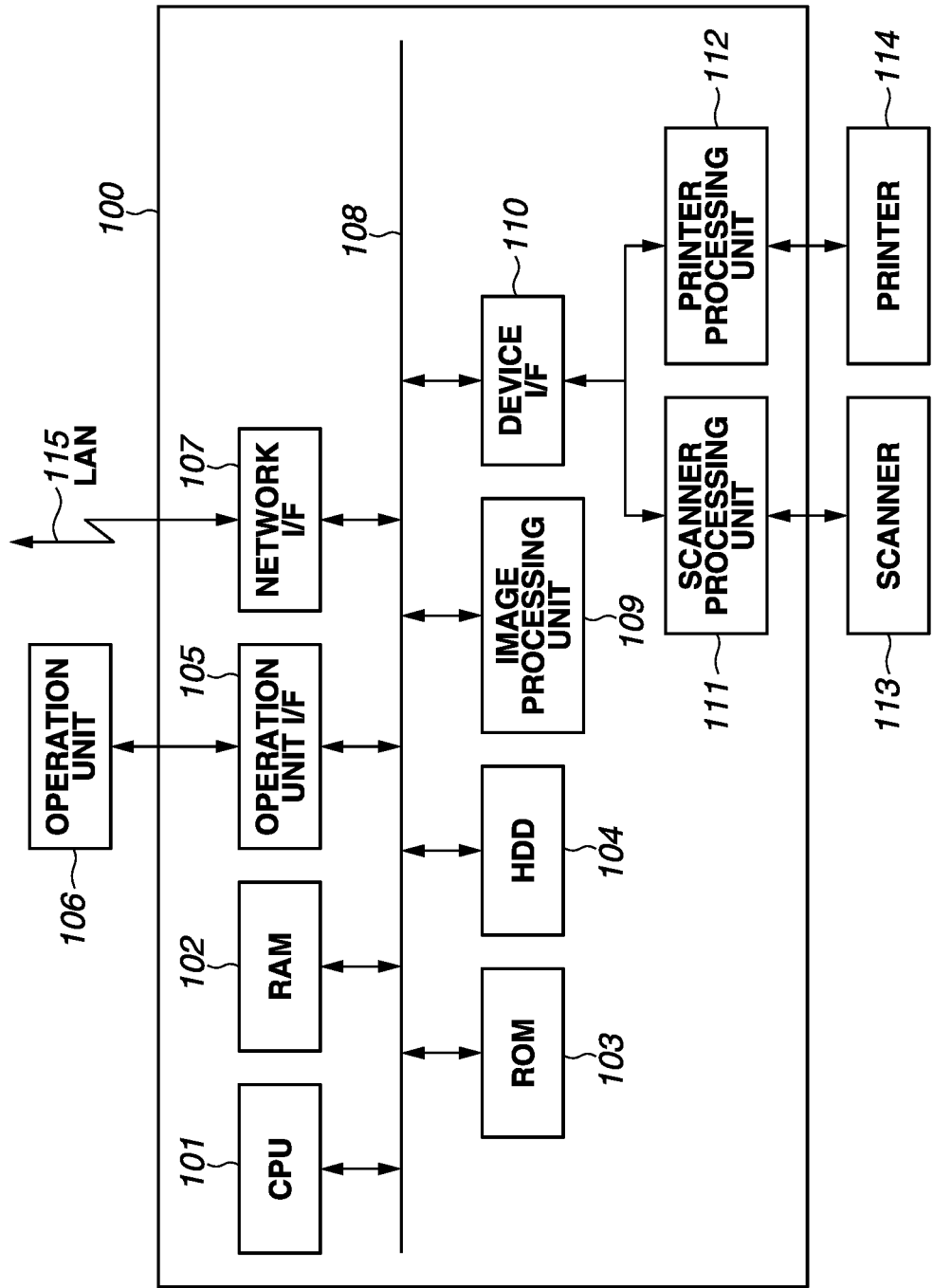
FIG. 1 is a block diagram illustrating a configuration of an image forming apparatus.

A first exemplary embodiment of the present disclosure will be described below in detail. FIG. 1 is a block diagram illustrating the configuration of an image forming apparatus. In the present exemplary embodiment, an image forming apparatus 1 is, for example, a printing apparatus in which a plurality of functions, such as a scan function and a print function, is integrated together as illustrated in FIG. 1. The image forming apparatus 1 includes a controller unit 100 that controls the entirety of the apparatus, a scanner 113, a printer 114, and an operation unit 106. The scanner 113 is an image input device that optically reads an image on a document set on the scanner 113. The printer 114 is an image output device that, based on image data, prints an image on a recording medium, such as a print sheet.

The operation unit 106 includes a hardware key, such as a numeric keypad, and a touch sensor for receiving the input of an instruction such as a job execution instruction from a user. The operation unit 106 further includes a display panel for displaying, to the user, apparatus information and job progress information, and/or a setting screen for setting the functions executable by the image forming apparatus 1. The operation unit 106 according to the present exemplary embodiment is a user interface including a touch screen. The touch screen displays to the user (notifies the user of) information such as state information regarding the image forming apparatus 1 or a setting screen and receives an operation performed on a displayed screen.

The scanner 113 and the printer 114 are connected to a scanner processing unit 111 and a printer processing unit 112, respectively, included in the controller unit 100. The operation unit 106 is connected to an operation unit interface (I/F) 105 included in the controller unit 100. With such a configuration, the scanner 113, the printer 114, and the operation unit 106 are each operated under the control of the controller unit 100.

The controller unit 100 includes a central processing unit (CPU) 101 that performs overall control of the blocks of the controller unit 100. The CPU 101 is connected to a random-access memory (RAM) 102, a read-only memory (ROM) 103, a hard disk drive (HDD) 104, the operation unit I/F 105, and a network I/F 107 via a system bus 108. The RAM 102 is a general-purpose RAM and is a memory for providing a work area for the CPU 101. The RAM 102 is also used as a memory for temporarily storing a parameter and a setting value, and as an image memory for storing image data in predetermined units, such as page units. The RAM 102 stores image data (information) read by the scanner 113, as a print job to be printed by the printer 114 and further stores image data (information) received by the network I/F 107, as a print job to be printed by the printer 114. In the present exemplary embodiment, deleting of a print job from the RAM 102 is referred to as "cancellation of the print job" or "cancellation of the printing of the print job". The ROM 103 is a general-purpose ROM and for example, stores a system boot program as a boot ROM. The HDD 104 stores a system software program, history data, image data, and a table. The functions of the image forming apparatus 1 are implemented by, for example, the CPU 101 loading a program stored in the ROM 103 into the RAM 102 and executing the program.

The operation unit I/F 105 is an interface for inputting and outputting information from and to the operation unit 106. According to an instruction from the CPU 101, the operation unit I/F 105 outputs display data to the operation unit 106 and transmits, to the CPU 101, information input on the operation unit 106 by the user. The network I/F 107 is connected to a local area network (LAN) 115, which is a wired or wireless medium, and enables the input and output of information between the image forming apparatus 1 and a device on the LAN 115. The network I/F 107 has a configuration compatible with the LAN 115 and can have a configuration compatible with Near-field communication at a wireless distance of about several tens of centimeters, for example. In such a case, the image forming apparatus 1 and a mobile wireless terminal communicate with each other.

An image processing unit 109 is a hardware module for executing general-purpose image processing and for example, executing a zoom in or out process, a rotation process, and a conversion process on image data acquired from outside via the LAN 115. The image processing unit 109 further executes the process of rasterizing a page description language (PDL) code received via the LAN 115 into a bitmap image. Further, in outputting image data compressed, encoded, and stored in the HDD 104 using the printer 114 via the printer processing unit 112, the image processing unit 109 executes the process of converting the image data into a format that can be processed by the printer processing unit 112. The device I/F 110 is connected to the scanner 113 and the printer 114 via the scanner processing unit 111 and the printer processing unit 112, respectively, and performs synchronous-to-asynchronous or asynchronous-to-synchronous conversion of image data or transmits a setting value and an adjustment value. Further, the device I/F 110 transmits state information regarding the scanner 113 or the printer 114 to the CPU 101. The state information includes error information indicating that, for example, a jam (a paper jam) occurs in the scanner 113 or the printer 114, or toner (a developer) used for printing by the printer 114 runs out.

The scanner processing unit 111 is a hardware module for performing various processes corresponding to the scan function, such as a correction process, a processing process, an image area separation process, a magnification process, and a binarization process, on read data (image data) read by and input from the scanner 113. The scanner 113 includes an automatic continuous document feeding device and a pressure plate reading device (not illustrated) and can also read a document placed on a document glass platen and read both sides of each of a plurality of documents. In the scanner 113, sensors for detecting the opening and closing of a document cover (not illustrated), the presence or absence of a document, and the document size are provided. Detection signals from the sensors and state information regarding the scanner 113 are transmitted to the CPU 101 via the scanner processing unit 111 and the device I/F 110, and the CPU 101 recognizes a state such as the occurrence of an error or the removal of the error in the scanner 113.

The printer processing unit 112 is a hardware module for performing processes corresponding to the print function, such as an output correction process corresponding to the output characteristics of the printer 114, a resolution conversion process, and an adjustment process for adjusting the print position of an image, on image data for print output. The printer 114 includes at least one sheet feeding cassette for storing print sheets. In the printer 114, sensors for detecting the number of remaining sheets in each sheet feeding cassette, the presence or absence of toner, and a paper jam on a sheet conveying path are provided. Detection signals from the sensors and state information regarding the printer 114 are transmitted to the CPU 101 via the printer processing unit 112 and the device I/F 110, and the CPU 101 recognizes a state, such as the occurrence of an error or the removal of the error in the printer 114. In other words, the CPU 101 detects the occurrence and the removal of a particular cause preventing the printing of a print job (e.g., sheet shortage, toner shortage, or a sheet jam) based on information from the sensors, and regulates whether to execute the printing based on the detection. In the following description, a particular cause preventing the printing of a print job will be referred to as an "error". In the present exemplary embodiment, an error caused by sheet shortage is an error associated with a print job and is removed by cancellation of a print job having caused the sheet shortage, or by replenishment of sheets. An error caused by toner shortage is associated with the image forming apparatus 1 and is removed by replenishment of toner. However, canceling of a print job having caused the toner shortage does not remove the error. An error caused by a paper jam is associated with the image forming apparatus 1 and is removed by the paper jam being removed. However, canceling of a print job having caused the paper jam does not remove the error.

Figure 2:
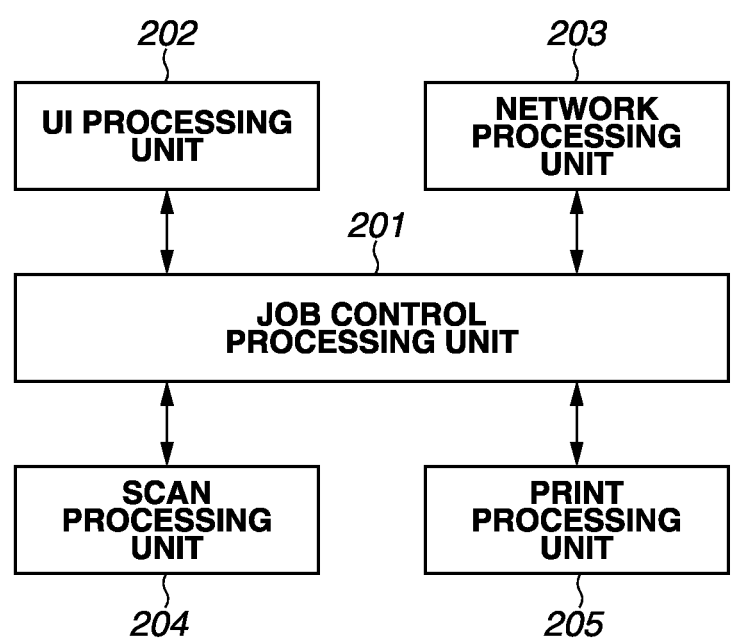
FIG. 2 is a diagram illustrating a software module configuration of the image forming apparatus.

FIG. 2 is a diagram illustrating the software module configuration of the image forming apparatus 1. Modules in FIG. 2 are implemented by the CPU 101 executing a program. A job control processing unit 201 controls other modules to perform overall control of the execution of jobs that occur in the image forming apparatus 1, such as a copy job, a print job, a scan job, and a user interface (UI) processing job.

A UI processing unit 202 performs processing regarding the operation unit 106 and the operation unit I/F 105. The UI processing unit 202 transmits information regarding an operation performed on the operation unit 106 by the user to the job control processing unit 201, and also displays a display screen on the operation unit 106 based on an instruction from the job control processing unit 201. The UI processing unit 202 receives from the user a copy instruction to read image data using the scanner 113 and print the image data using the printer 114, and transmits the copy instruction to the job control processing unit 201. The UI processing unit 202 edits drawing data to be displayed on the operation unit 106.

A network processing unit 203 performs a communication process with a device (e.g., a host computer) on the LAN 115 via the network I/F 107. If receiving a control command and data (e.g., print data or image data described in a page description language) from the device on the LAN 115, the network processing unit 203 transmits information regarding the control command and the data to the job control processing unit 201. That is, the network processing unit 203 receives, from an external apparatus on the LAN 115, image data (information) and a print instruction to print the image data using the printer 114, and transmits the instruction and the image data to the job control processing unit 201. The network processing unit 203 transmits a control command and data to the device on the LAN 115 based on an instruction from the job control processing unit 201.

A scan processing unit 204 performs control to cause the scanner 113 and the scanner processing unit 111 to execute a reading process for reading a document placed on the scanner 113 based on an instruction from the job control processing unit 201. The scan processing unit 204 performs control to cause the scanner processing unit 111 to execute image processing on read image data. The scan processing unit 204 acquires state information (e.g., error information indicating the presence or absence of an error) regarding the scanner processing unit 111 and the scanner 113 and transmits the state information to the job control processing unit 201.

A print processing unit 205 performs control to cause the image processing unit 109, the printer processing unit 112, and the printer 114 to execute a printing process for printing a print job based on an instruction from the job control processing unit 201. The print processing unit 205 receives information such as image data to be printed, image information (the size, the color mode, and the resolution of the image data), and output sheet information (the size and the print direction) from the job control processing unit 201. Then, the print processing unit 205 performs control to cause the image processing unit 109 and the printer processing unit 112 to execute appropriate image processing on the image data, and performs control to cause the printer processing unit 112 and the printer 114 to execute a printing process for printing the image data on a print sheet (a sheet). The print processing unit 205 acquires state information (e.g., error information indicating the presence or absence of the occurrence of an error, such as sheet shortage, toner shortage, or a paper jam) regarding the printer processing unit 112 and the printer 114 and transmits the state information to the job control processing unit 201.

The job control processing unit 201 receives information transmitted from the UI processing unit 202 or the network processing unit 203 as a print job and registers the print job in a job list managed in the RAM 102. That is, in response to receiving print data from an external apparatus via the network I/F 107 or receiving a copy instruction from the user via the operation unit 106 and the operation unit I/F 105, the job control processing unit 201 receives a print job. The job control processing unit 201 then stores the print job in the RAM 102. The job control processing unit 201 deletes the print job from the RAM 102, thereby canceling the printing of the print job, as will be described below. The job control processing unit 201 changes the print job to a print standby state in the job list without deleting the print job from the RAM 102, thereby preventing the printing from being automatically executed even if a suspension cause is removed. The job control processing unit 201 provides each module an instruction to process a job.

Figure 3:
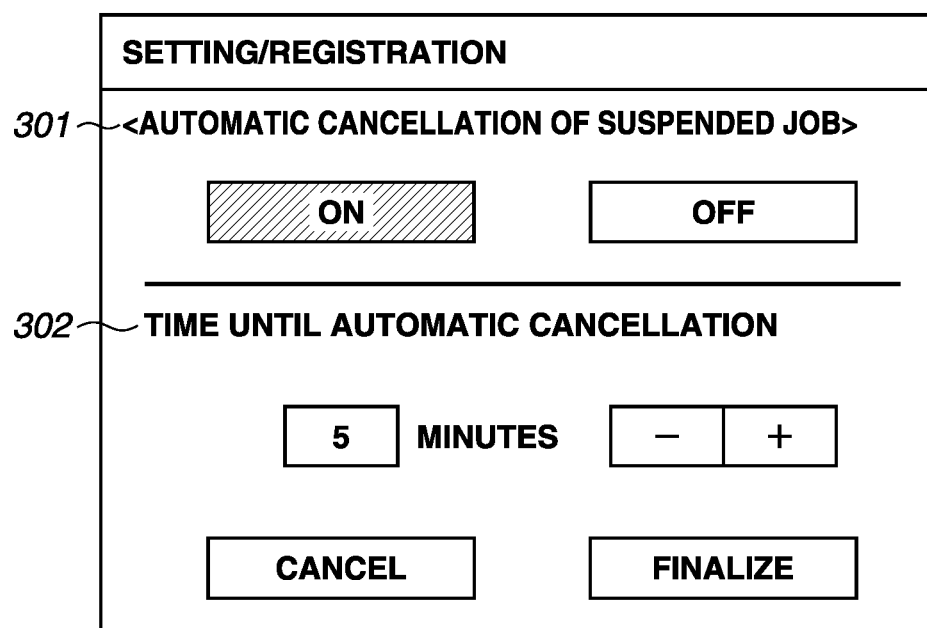
FIG. 3 is a diagram illustrating a setting screen for automatic cancellation of a print job.

FIG. 3 is a diagram illustrating a setting screen regarding the automatic cancellation of a job when a printing process is suspended due to the occurrence of an error in the present exemplary embodiment. A setting item 301 is used for receiving the setting of whether to enable the function of automatically canceling a suspended job when a setting time has elapsed after the occurrence of an error. The "suspended job" is a print job for which the printing is prevented due to the error. If the user specifies "on" and when a predetermined time has elapsed after the occurrence of the error, the cancellation of the suspended job is executed. If the user specifies "off", the cancellation of the suspended job is not executed. "The automatic cancellation of a job" refers to the process of, after a job is received and even if a cancellation instruction is not provided by the user, canceling the job.

A setting item 302 is used for receiving from the user the specifying of the time until the execution of the automatic cancellation of the suspended job, and for setting the specified time as the setting time. If "on" is specified in the setting item 301, the setting item 302 is in the state where the setting item 302 is settable. If "off" is specified in the setting item 301, the setting item 302 is in a grayed-out state so that the setting item 302 is not settable. The setting time can be specified by minutes in the range of 0 to 999 minutes. In FIG. 3, using a plus button and a minus button, the user can adjust the setting time from a value "5 minutes" displayed by default. If a finalize button is pressed by the user, the setting contents received on the setting screen in FIG. 3 are finalized, and the finalized settings are saved in the HDD 104 or the RAM 102 by the job control processing unit 201 and the UI processing unit 202. If a cancel button is pressed by the user, the settings received on the setting screen in FIG. 3 are canceled. In the present exemplary embodiment, if the user sets 0 minutes as the time until the automatic cancellation, all the print jobs registered in the job list at the time when the error occurs are immediately canceled at the time when the error occurs. If a time other than 0 minutes is set, a print job registered in the job list is not canceled during the time period from when the error occurs to this set time. If, however, the setting time or more has elapsed with the error not being removed, all the print jobs having registered in the job list by that time are canceled in the present exemplary embodiment. As will be described below, however, if a print job is received in the state where the setting time or more has elapsed with the error not being removed (the state where the error continues for the setting time or more), the received print job is immediately canceled. That is, before the setting time elapses from the time when a new print job is registered in the job list, the new print job is canceled. In the present exemplary embodiment, a user who is allowed to set the setting items 301 and 302 is only a user having administrator authority on the image forming apparatus 1. Thus, the image forming apparatus 1 has the function of authenticating an administrator. A user inputs an ID and a password of an administrator to the operation unit 106, and if the ID and the password are correct, the image forming apparatus 1 authenticates the user as a user having administrator authority.

Figure 4:
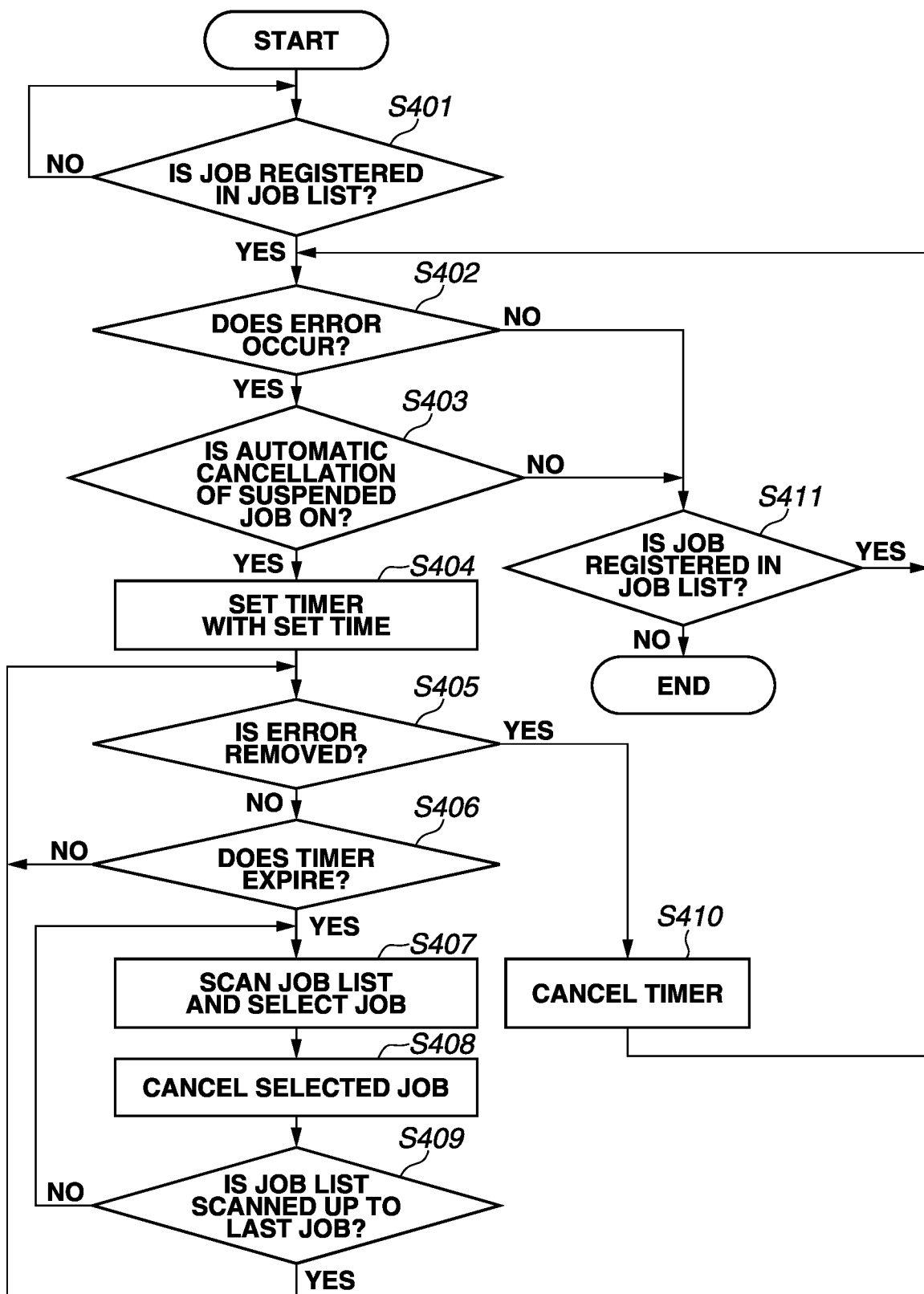
FIG. 4 is a flowchart illustrating a control process for controlling execution of automatic cancellation of a print job.

FIG. 4 is a flowchart illustrating a control process for controlling the execution of job cancellation. According to the present exemplary embodiment, for a job for which the printing is not completed due to an error, the function of automatically canceling all the print jobs registered in the job list at the time when the time elapses is executed after the lapse of the time set in the setting item 302. This function corresponds to the processes of YES in step S406 to step S408 (described below). For a print job newly received in the state where the setting time or more has elapsed with the error not being removed, the function of automatically canceling the print job before the setting time elapses from the time when the print job is received is also executed. This function corresponds to the processes of YES in step S409, NO in step S405, and YES in step S406 to step S408 (described below).

The processing of this flowchart is implemented by, for example, the CPU 101 loading a program stored in the HDD 104 into the RAM 102 and executing the program. The flowchart is started by the job control processing unit 201 registering a job in the job list. Hereinafter, a "job" will refer to a print job. The registration of a job received by the image forming apparatus 1 in the job list is performed in parallel with the processing of this flowchart.

In step S401, the job control processing unit 201 checks whether a job is registered in the job list. If a job is registered (YES in step S401), the processing proceeds to step S402. If a job is not registered in the job list (NO in step S401), the processing returns to step S401.

In step S402, the job control processing unit 201 determines whether an error occurs. The job control processing unit 201 receives error information from the scan processing unit 204 or the print processing unit 205. If the error information indicates that a particular cause preventing the execution (continuation) of printing occurs, it is determined that the error occurs. The job control processing unit 201 starts measuring time using a timer based on the occurrence of the error.

Examples of an error (a particular cause preventing printing, or a suspension cause) caused by the printer 114 include sheet shortage, which indicates a case where sheets run out in the sheet feeding cassette, sheet mismatch, which indicates a case where a specified sheet is not present in a sheet cassette, a paper jam (a sheet jam) on the sheet conveying path, and toner shortage. If the print processing unit 205 notifies the job control processing unit 201 of error information, the job control processing unit 201 registers in the job list the information indicating that the target job is a suspended job. Then, the job control processing unit 201 instructs the scan processing unit 204 and the print processing unit 205 to stop the printing of the job.

Examples of an error caused by the scanner 113 include a paper jam in the automatic continuous document feeding device (not illustrated). If the scan processing unit 204 notifies the job control processing unit 201 of error information, the job control processing unit 201 registers in the job list the information indicating that the target job is a suspended job. Then, the job control processing unit 201 instructs the scan processing unit 204 and the print processing unit 205 to stop the printing of the job.

If it is determined in step S402 that the error occurs (YES in step S402), the job control processing unit 201 displays, on the operation unit 106 using the UI processing unit 202, a screen (an error screen) indicating that the error occurs. The processing proceeds to step S403. If it is determined that the error does not occur (NO in step S402), the processing proceeds to step S411.

In step S403, the job control processing unit 201 determines whether the setting item 301 in FIG. 3 is set to on. If it is determined that the setting item 301 is on (YES in step S403), the processing proceeds to step S404. If it is determined that the setting item 301 is not set to on (NO in step S403), the processing proceeds to step S411.

In step S404, the job control processing unit 201 sets in the timer the waiting time for the execution of automatic cancellation received in the setting item 302 in FIG. 3 (also referred to as an "extension time", a "setting time", or a "timer time"). The job control processing unit 201 starts the timer. The timer according to the present exemplary embodiment is a countdown timer. If the job control processing unit 201 starts the timer, the timer counts down the set setting time. The countdown timer counts down the time in predetermined time units (e.g., in one-minute units). For example, if "5 minutes" is set as the setting time, the job control processing unit 201 counts down the countdown timer by "1" from "5 (minutes)" every time a minute elapses.

In step S405, the job control processing unit 201 determines whether the error is removed (the suspension cause is removed). More specifically, the job control processing unit 201 receives error information from the scan processing unit 204 or the print processing unit 205. If the error information indicates that a particular error does not occur, the job control processing unit 201 determines that the error is removed. If it is determined that the error is removed (YES in step S405), the processing proceeds to step S410. If it is determined that the error is not removed (NO in step S405), the processing proceeds to step S406.

In step S406, the job control processing unit 201 determines whether the timer time that is set in step S404 expires. That is, the job control processing unit 201 determines whether the setting time or more elapses with the error not being removed. If the countdown timer is 0 (zero), it is determined that the timer time expires. If it is determined that the timer time expires (YES in step S406), to execute the automatic cancellation of the job, the processing proceeds to step S407. If it is determined that the timer time does not expire (NO in step S406), the processing returns to step S405. Since the countdown timer remains 0 also after the expiration of the timer time, if it is determined again in step S406 whether the timer time expires, the processing proceeds to step S407. If the countdown timer reaches 0, the job control processing unit 201 may manage the state of the image forming apparatus 1 as an automatic cancellation execution state. In such a case, in step S406, the job control processing unit 201 may determine whether the state of the image forming apparatus 1 is the automatic cancellation execution state. If it is determined that the state of the image forming apparatus 1 is the automatic cancellation execution state, the processing may proceed to step S407.

Next, in the loop of the processes of steps S407 to S409, the printing of all the print jobs registered in the job list at the time when the timer time expires is canceled. A specific processing is as follows.

In step S407, if the job control processing unit 201 detects that the time (the timer time) up to the automatic cancellation expires, the job control processing unit 201 acquires the list (the job list) of jobs received by the current time (i.e., by the time when the timer expires). The job control processing unit 201 then selects the first job in the job list.

In step S408, the job control processing unit 201 cancels the job selected in step S407. That is, the printing of the selected print job is canceled. As a specific example, the job control processing unit 201 deletes information regarding the selected print job from the job list (i.e., the RAM 102) so that the printing of the selected print job will not be executed from this point. At this time, the job control processing unit 201 also deletes print data of the print job. This configuration prevents the automatic execution of the print job even if the suspension cause is removed after the lapse of the timer time. In step S408, the job control processing unit 201 may record, as history information regarding the print job canceled in step S408, information (a message or an identification number) indicating that the print job is canceled because the error is not removed for a certain time. This information can be referenced by the user later.

Instead of the cancellation process in step S408, the following process may be performed. That is, the job control processing unit 201 does not delete the print job selected in step S407 from the RAM 102 (i.e., does not cancel the print job), and changes the state of the print job to a waiting-for-print-instruction state. Consequently, the print job is in the state where the print job waits for a print instruction from the user, and thus, even if the suspension cause is removed after the lapse of the timer time, the print job is not automatically printed. After the suspension cause is removed, the user provides a print instruction to print the print job via a print incompletion job list (not illustrated), whereby the print job in the waiting-for-print-instruction state is printed.

In step S409, the job control processing unit 201 determines whether the job list is scanned up to the last job in the job list, i.e., the newest job in the job list. If it is determined that the job list is not scanned up to the last job in the job list (NO in step S409), then in step S407, the job control processing unit 201 selects the next job in the job list. Then, in step S408, the job control processing unit 201 executes the cancellation. If it is determined in step S409 that the job list is scanned up to the last job in the job list (YES in step S409), the processing returns to step S405.

Returning to step S405 after the process of step S409 is one of the features of the present exemplary embodiment. More specifically, after the process of step S409, the processing returns to step S405 without canceling the timer. Thus, if the error is not removed yet, the timer remains expired. Thus, via the determinations of steps S405 and S406, the processes of steps S407 to S409 are executed. As a result, a print job received and newly registered in the job list after the expiration of the timer time and before the removal of the error is quickly canceled without waiting for the further lapse of the timer time. Instead of this cancellation process, the process of changing the state of the print job to a waiting-for-print-instruction state may be executed. The print job in the waiting-for-print-instruction state is reserved in the image forming apparatus 1 without being printed by when the image forming apparatus 1 receives a print instruction from the user.

If it is determined in step S405 that the error is removed (YES in step S405), then in step S410, the job control processing unit 201 cancels the timer set in step S404. Using the UI processing unit 202, the job control processing unit 201 clears the error screen displayed on the operation unit 106 and changes back to a normal screen (a standby screen). Alternatively, for a predetermined time after clearing the error screen, the job control processing unit 201 displays a screen indicating that the error is removed on the operation unit 106. The job control processing unit 201 then displays the normal screen (the standby screen). The job control processing unit 201 cause the scan processing unit 204 and the print processing unit 205 to automatically resume the printing process for printing the suspended print job. This resumption of the printing is executed without an additional print instruction from the user after the operation of removing the error is performed. As described above, if the suspension cause is removed before an extension time (a setting time) elapses after the suspension cause (an error) occurs, a printing process for printing a suspended print job and a subsequent print job is automatically resumed. After the process of step S410, the processing returns to step S402.

If it is determined in step S402 that the error does not occur (NO in step S402), or if it is determined in step S403 that the setting item 301 is not set to on (NO in step S403), then in step S411, the job control processing unit 201 determines whether a job is registered in the job list. If it is determined that a job is registered in the job list (YES in step S411), the processing returns to step S402. If it is determined that a job is not registered in the job list (NO in step S411), the processing of this flow ends. This flow ends in a case where the printing of a job is completed. After this flow ends, and if a job is newly registered in the received job list, this flow starts again.

In the present exemplary embodiment, a countdown timer is used, but is not limited thereto. Alternatively, any method that enables measurement of the time during which an error continues after the error occurs (i.e., the time elapsed without the error being removed) may be used. For example, in step S404, the job control processing unit 201 may start a countup timer from 0 (zero). Then, in step S406, the job control processing unit 201 may determine whether the countup timer reaches the setting time.

Yet alternatively, for example, in step S404, the job control processing unit 201 may acquire the current time from a real-time clock (RTC) and store the acquired current time. In step S406, the job control processing unit 201 may acquire the current time from the RTC. The job control processing unit 201 may determine whether the difference time between the time acquired in step S406 and the time stored in step S404 reaches the setting time.

According to the present exemplary embodiment, after the expiration of a timer time, it is possible to automatically cancel the printing of a print job. Moreover, it is possible to quickly and automatically cancel a print job newly received while an error continues after the expiration of the timer time, without waiting for the further expiration of the timer time. This can resolve an issue regarding security that a highly confidential document is seen or erroneously taken away by another person.

A second exemplary embodiment of the present disclosure will be described below in detail. In the first exemplary embodiment, a configuration is employed in which the deletion of a job registered in the job list is continued unless the error is removed (the suspension cause is removed). In the present exemplary embodiment, a configuration is employed in which the time after the expiration of the time until the automatic cancellation (the timer time) is measured, and if the measured time exceeds a certain time, the automatic cancellation is stopped.

Figure 5:
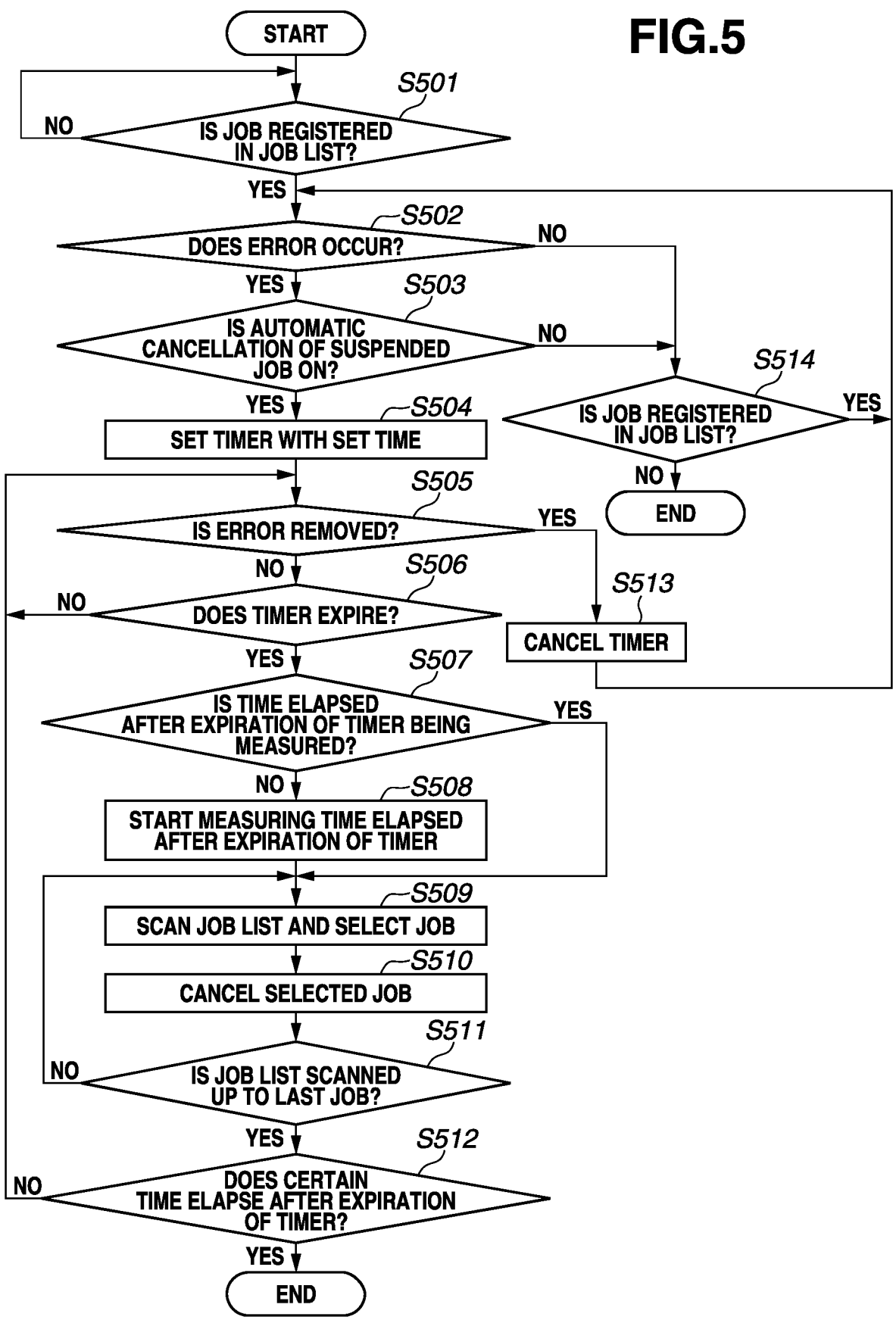
FIG. 5 is a flowchart illustrating a control process for controlling execution of automatic cancellation of a print job.

FIG. 5 is a flowchart illustrating a control process for controlling the execution of job cancellation. In the present exemplary embodiment, for a job for which the execution is suspended due to an error, such as a jam, a job cancellation operation for automatically canceling the job after a certain time is executed. The processing of this flowchart is implemented by, for example, the CPU 101 loading a program stored in the HDD 104 into the RAM 102 and executing the program. The flowchart is started by the job control processing unit 201 registering a job in the job list.

The processes in steps S501 to S506, S509 to S511, S513, and S514 are similar to those in steps S401 to S406, S407 to S409, S410, and S411, respectively. Thus, the detailed description of these processes are omitted. The process of step S506, however, is different from the process of step S406 in that if the job control processing unit 201 determines that the timer time expires, the processing proceeds to step S507. Further, the process of step S511 is different from the process of step S409 in that if it is determined that the job list is scanned up to the last job in the job list, the processing proceeds to step S512. Then, the present exemplary embodiment has the feature that the processing of this flow ends based on the determination result of step S512.

The processes of steps S507 to S512 correspond to the following two functions. One is a first automatic cancellation function for, after the expiration of the timer time, canceling the printing of all the print jobs received up to the time when the timer time expires. The other is a second automatic cancellation function for, after the expiration of the timer time, canceling the printing of a print job newly received by the time elapsed with the error not being removed reaches a certain time.

In step S507, the job control processing unit 201 determines whether the time elapsed after the expiration of the timer is being measured. If the elapsed time is being measured (YES in step S507), the processing proceeds to step S509. If the elapsed time is not being measured (NO in step S507), the processing proceeds to step S508.

In step S508, the job control processing unit 201 starts measuring the time elapsed after the expiration of the timer time. The countdown timer remains 0 also after the expiration of the timer time. Thus, also if it is determined again in step S506 whether the timer time expires, the processing proceeds to step S507.

In step S512, the job control processing unit 201 determines whether the time elapsed after the expiration of the timer that starts being measured in step S508 is greater than or equal to a certain time. The certain time is set using a time set in a setting item (not illustrated) via the operation unit 106 or a time determined in advance and stored in the HDD 104. If the certain time does not elapse after the expiration of the timer (NO in step S512), the processing returns to step S505. In step S505, if the error is not yet removed, the process of step S506 is executed. Since the timer time expires, the processing proceeds to step S507. As a result, since the time elapsed after the expiration of the timer starts being measured in step S508, the processing proceeds from step S507 to step S509 this time. In such a case, the processes of steps S509 to S511 function as the process of canceling the printing of a print job newly received, after the expiration of the timer time, in the state where the error is not removed.

If it is determined in step S512 that the certain time elapses after the expiration of the timer (YES in step S512), the flowchart ends. Since the processing ends, then for a print job newly received after the lapse of the certain period after the expiration of the timer, the processing is performed from the beginning (step S501). That is, the printing of a print job newly received, after the lapse of the certain period after the expiration of the timer, in the state where the error is not yet removed is not quickly canceled, and is automatically canceled after the setting time or more elapses with the error not being removed. If the error is removed within this setting time, the newly received print job is automatically printed.

As described above, the processing in which the processes of steps S509 to S511 are performed via the processes steps S507 and S508 corresponds to the first automatic cancellation function. Moreover, the processing in which, after the determination of step S512, the processing returns to step S505, and after the process of step S507, the processes of steps S509 to S511 are performed corresponds to the second automatic cancellation function.

According to the present exemplary embodiment, after the expiration of a timer time, it is possible to automatically cancel the printing of a print job. Furthermore, it is possible to quickly and automatically cancel a print job newly received within a certain time in the time in which an error continues after the expiration of the timer time, without waiting for the further expiration of the timer time. Moreover, for a print job received after the lapse of the certain time, the printing is not automatically canceled until the timer time expires again, so that the automatic printing can be executed after the error is removed. This can resolve an issue regarding security that a highly confidential document is seen or erroneously taken away by another person, and also provide an opportunity for the automatic execution of printing due to the removal of an error. Thus, it is possible to provide a printing apparatus with more excellent usability.

Other Exemplary Embodiments

In the above exemplary embodiments, a configuration is employed in which, if it is detected that the timer time expires, the cancellation of the first to last jobs in the list of jobs received up to the current time (up to the time when the timer expires) continues to be performed. That is, if the timer time expires, all the print jobs in the list are canceled. The present disclosure, however, is also applicable to a configuration in which, after a single job is canceled, whether or not the error is removed is checked. More specifically, in the flowchart of FIG. 4, a configuration may be employed in which the process of step S409 is omitted, and the processing proceeds from step S408 to step S405. In the flowchart of FIG. 5, a configuration may be employed in which the process of step S511 is omitted, and the processing proceeds from step S510 to step S512. The cancellation of the print job is performed in step S408 in such a manner, and thus, for example, the cancellation of a print job having caused sheet shortage leads to removing the error, and the processing proceeds to step S410 based on the determination of step S405. Thus, since the next print job is started in the state where the error is removed and also the state where the timer is canceled, if an error occurs in the printing of this print job, the countdown timer starts anew. Then, if the setting time or more elapses without the error being removed, the printing of the print job is canceled.

In the above exemplary embodiments, all the jobs are cancellation targets. Alternatively, a job may be excluded from cancellation targets depending on the type of the job. For example, in a case where it is difficult to input a job again due to a difficulty in specifying a sender as in facsimile, the job may be removed from cancellation targets. Jobs may be accumulated in a memory, and a job that requires an operation of a user for printing (reservation printing or the reception of facsimile by a memory) may be excluded from cancellation targets.

In the above exemplary embodiments, if the timer time elapses, a print job received by that time and a print job received after that time are canceled. As described above, however, the print jobs may not be canceled, but may be prevented from being automatically executed after the removal of the suspension cause. For example, the print jobs may be reserved in the printing apparatus so that the print jobs are executed based on an instruction from the user after the removal of the suspension cause.

The present disclosure can also be realized by the process of supplying a program for implementing one or more functions of the above exemplary embodiments to a system or an apparatus via a network or a storage medium, and causing one or more processors of a computer of the system or the apparatus to read and execute the program. Further, the present disclosure can also be realized by a circuit (e.g., an application-specific integrated circuit (ASIC)) for implementing the one or more functions.

A new print job received after a print job is automatically canceled based on the setting time is automatically canceled after the setting time elapses again, unless the suspension cause is removed. If, however, the suspension cause is removed before the setting time elapses again, the printing of the new print job is automatically executed. In other words, the following case can occur. Assume that after a user A inputs a print job, the print job is canceled because a setting time elapses with a suspension cause not being removed. After that, a user B inputs a print job in the state where the suspension cause is not removed. In such a case, the printing of the print job input by the user B is suspended until the setting time elapses again. Thus, if the user A removes the suspension cause, the printing of the print job input by the user B is automatically printed. As a result, the user A can erroneously take back a print product that belongs to the user B by rights. According to the present exemplary embodiment, it is possible to resolve at least one of the above issues.

According to the present exemplary embodiment, it is possible to cancel the printing of a print job newly received in the state where a setting time or more elapses with a particular cause for preventing the printing of a print job not being removed, before the setting time further elapses.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. A printing apparatus comprising:
a reception interface (IF) configured to receive a print job;
a memory configured to store a plurality of print jobs received by the reception IF; and
controller configured to execute a print job received by the reception IF,
wherein the controller cancels the plurality of print jobs stored in the memory in a state where the print job is suspended by a suspension cause and a predetermined time elapses with the suspension cause not being removed, and the controller cancels a new print job received by the reception IF in a state where the suspension cause has not been removed and the predetermined time has elapsed without waiting for further elapse of the predetermined time.

2. The printing apparatus according to claim 1, wherein the new print job received by the reception IF in the state where the suspension cause for suspending the print job has not been removed and the predetermined time has elapsed is stored in the memory, and the controller cancels the new print job stored in the memory.

3. The printing apparatus according to claim 1, wherein the memory is a RAM.

4. The printing apparatus according to claim 1, wherein the plurality of print jobs includes the suspended print job.

5. The printing apparatus according to claim 1, further comprising an operation unit configured to receive an instruction for specifying a time from a user, wherein the controller sets the time specified by the operation unit as the predetermined time.

6. The printing apparatus according to claim 1, wherein the controller manages a list of print jobs, registers in the list a plurality of print jobs stored in the memory, and deletes the plurality of print jobs from the list and cancels printing of the plurality of print jobs stored in the memory when the predetermined time elapses.

7. The printing apparatus according to claim 1, wherein at least the cancellation of the new print job is performed without receiving a cancellation instruction from a user.

8. The printing apparatus according to claim 1, wherein at least the cancellation of the new print job is automatically performed.

9. The printing apparatus according to claim 1, further comprising a printer configured to convey a sheet and print an image on the conveyed sheet using toner,
wherein the suspension cause is a sheet jam or toner shortage.

10. The printing apparatus according to claim 1, further comprising an operation unit configured to notify a user of information,
wherein the operation unit notifies the user that the print job is canceled in the state where the print job has been suspended and the predetermined time has elapsed.

11. The printing apparatus according to claim 1, wherein the controller includes an operation unit configured to receive a setting whether to cancel the plurality of print jobs stored in the memory in the state where the print job has been suspended and the predetermined time has elapsed.

12. The printing apparatus according to claim 1, wherein the plurality of print jobs stored in the memory to be canceled by the controller includes a canceled print job and a suspended print job.

13. The printing apparatus according to claim 1, wherein the plurality of print jobs is deleted by the canceling.

14. The printing apparatus according to claim 1, wherein canceling the new print job without waiting for further elapse of the predetermined time means immediately cancelling the new print job upon receiving the new print job.

* * * * *